(12) United States Patent
Piscopo, Jr.

(10) Patent No.: US 11,546,466 B2
(45) Date of Patent: Jan. 3, 2023

(54) CALL SCREENING SERVICE FOR INBOUND COMMUNICATIONS

(71) Applicant: FIRST ORION CORP., North Little Rock, AR (US)

(72) Inventor: Robert Francis Piscopo, Jr., Kirkland, WA (US)

(73) Assignee: FIRST ORION CORP., North Little Rock, AR (US)

( * ) Notice: Subject to any disclaimer, the term of this patent is extended or adjusted under 35 U.S.C. 154(b) by 0 days.

(21) Appl. No.: 17/229,770

(22) Filed: Apr. 13, 2021

(65) Prior Publication Data

US 2021/0234960 A1 Jul. 29, 2021

Related U.S. Application Data

(63) Continuation of application No. 16/730,983, filed on Dec. 30, 2019, now Pat. No. 10,979,565.

(51) Int. Cl.
| | |
|---|---|
| *H04M 3/436* | (2006.01) |
| *H04M 3/42* | (2006.01) |
| *H04M 3/51* | (2006.01) |
| *H04W 80/10* | (2009.01) |
| *H04L 65/1104* | (2022.01) |

(52) U.S. Cl.
CPC ......... *H04M 3/436* (2013.01); *H04L 65/1104* (2022.05); *H04M 3/42042* (2013.01); *H04M 3/42059* (2013.01); *H04M 3/42348* (2013.01); *H04M 3/5158* (2013.01); *H04W 80/10* (2013.01)

(58) Field of Classification Search
CPC ............. H04M 3/436; H04M 3/42042; H04M 3/42059; H04M 3/42348; H04M 3/5158; H04L 65/1006; H04W 80/10
USPC ...................................................... 379/88.22
See application file for complete search history.

(56) References Cited

U.S. PATENT DOCUMENTS

| | | | |
|---|---|---|---|
| 8,619,596 B2 | 12/2013 | Wiley et al. | |
| 10,708,417 B1 * | 7/2020 | Davis ...................... | H04L 65/80 |
| 10,979,565 B1 * | 4/2021 | Piscopo, Jr. .......... | H04W 80/10 |
| 2006/0067505 A1 * | 3/2006 | Heinmiller ........... | H04Q 3/0037 |
| | | | 379/229 |
| 2006/0209788 A1 * | 9/2006 | Boldt ................... | H04Q 3/0045 |
| | | | 370/352 |
| 2008/0043718 A1 * | 2/2008 | Chu ..................... | H04M 7/0075 |
| | | | 370/352 |
| 2010/0080369 A1 | 4/2010 | Hurst et al. | |
| 2011/0051714 A1 * | 3/2011 | Somes ................. | H04Q 3/0025 |
| | | | 370/352 |
| 2011/0072141 A1 | 3/2011 | Veenstra et al. | |
| 2014/0269496 A1 * | 9/2014 | Mufti .................... | H04L 65/103 |
| | | | 370/328 |
| 2018/0054396 A1 * | 2/2018 | Moore ................ | H04L 65/1006 |
| 2020/0112775 A1 | 4/2020 | Kaushal et al. | |

* cited by examiner

*Primary Examiner* — Binh Kien Tieu (57) ABSTRACT

One example method of operation may include receiving a call message intended for a call recipient, removing one or more portions of call message data included in the call message, identifying one or more of a trunk group and an entry point associated with the received call message, adding one or more of a trunk group identifier (TGRP) and a universally unique identifier (UUID) to the call message to create a modified call message, and forwarding the modified call message to a destination network associated with the call recipient.

18 Claims, 9 Drawing Sheets

CALL SCREENING SERVICE FOR INBOUND COMMUNICATIONS

CROSS-REFERENCE TO RELATED APPLICATIONS

This application is a continuation of U.S. patent application Ser. No. 16/730,983, filed on Dec. 30, 2019, now U.S. Pat. No. 10,979,565, issued on Apr. 13, 2021, the entire contents of which are hereby incorporated by reference.

This application relates to application Ser. No. 16/378,817, filed on Apr. 9, 2019, and entitled CALL SCREENING SERVICE FOR COMMUNICATION DEVICES, the entire contents of which are hereby incorporated by reference.

TECHNICAL FIELD OF THE APPLICATION

This application relates to inbound call management, and more specifically to a call screening service for inbound communications.

BACKGROUND OF THE APPLICATION

Conventionally, mobile device users receive calls from undesired sources all the time, every day and sometimes every hour depending on the particular day. The source numbers which are used to dial the users may be local numbers, long-distance numbers, anonymous numbers, etc. The calls may be spam calls, scam calls, robocalls, etc. With recent updates to smartphones and the call screen user interfaces used during a call, the sources of the calls are generally displayed in some capacity to permit the user to identify whether to answer the phone call or not. However, there are generally limited tools available to demonstrate that the call is likely to be a scam or spam caller, especially in real-time, so a caller can quickly decide whether to answer the call, drop the call, block the call, etc.

Additionally, network topology information may be hidden via obfuscation and/or information stripping conducted by an intermediate network which limits the capability of the network under protection (network being monitored) to identify the accurate call routing information. Such call routing information, such as call origination and call routing path information may be necessary to identify whether the call routing information is from a source of scam calls.

SUMMARY OF THE APPLICATION

Example embodiments of the present application provide a method that includes receiving a call message intended for a call recipient, removing one or more portions of call message data included in the call message, identifying one or more of a trunk group and an entry point associated with the received call message, adding one or more of a trunk group identifier (TGRP) and a universally unique identifier (UUID) to the call message to create a modified call message, and forwarding the modified call message to a destination network associated with the call recipient.

Another example embodiment may include an apparatus that includes a receiver configured to receive a call message intended for a call recipient, a processor configured to remove one or more portions of call message data included in the call message, identify one or more of a trunk group and an entry point associated with the received call message, add one or more of a trunk group identifier (TGRP) and a universally unique identifier (UUID) to the call message to create a modified call message, and a transmitter configured to forward the modified call message to a destination network associated with the call recipient.

Still yet a further example embodiment may include a non-transitory computer readable storage medium configured to store instructions that when executed cause a processor to perform receiving a call message intended for a call recipient, removing one or more portions of call message data included in the call message, identifying one or more of a trunk group and an entry point associated with the received call message, adding one or more of a trunk group identifier (TGRP) and a universally unique identifier (UUID) to the call message to create a modified call message, and forwarding the modified call message to a destination network associated with the call recipient.

BRIEF DESCRIPTION OF THE DRAWINGS

FIG. 1 illustrates an example of direct and indirect peering network configurations according to example embodiments.

FIG. 2A illustrates an example of interexchange network call routing according to example embodiments.

FIG. 2B illustrates an example of interexchange network call routing with identification assignments according to example embodiments.

FIG. 2C illustrates an example of interexchange network call routing via trunk group assignments according to example embodiments.

FIG. 3A illustrates a system signaling diagram of call management for origination identifiers according to example embodiments.

FIG. 3B illustrates a system signaling diagram of call management for trunk group parameter identifiers according to example embodiments.

FIG. 4 illustrates an example flow diagram process of a call management configuration according to example embodiments.

FIG. 5 illustrates a logic diagram with example data input and output parameters for performing call processing according to example embodiments.

FIG. 6 illustrates an example network entity device configured to store instructions, software, and corresponding hardware for executing the same, according to example embodiments of the present application.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide a call monitoring, auditing and/or processing platform configured to provide call screening of potential scam/spam callers. The term 'scam' and 'spam' are used interchangeably and are intended to identify various types of unwanted/unexpected calls, such as those calls which are attempting to defraud persons of money and/or sell products and services which are undesirable and arbitrary. Those types of calls usually tend to be performed by certain origination call number sources and call number prefixes which can be readily identified and which are used to perform large-volume calling of targeted user devices. The calling sources may use dynamic call routing features which changed numbers, locations, etc., however, certain characteristics may be identified to limit the scam caller entities' success in communicating with intended call recipients.

Figure 1:
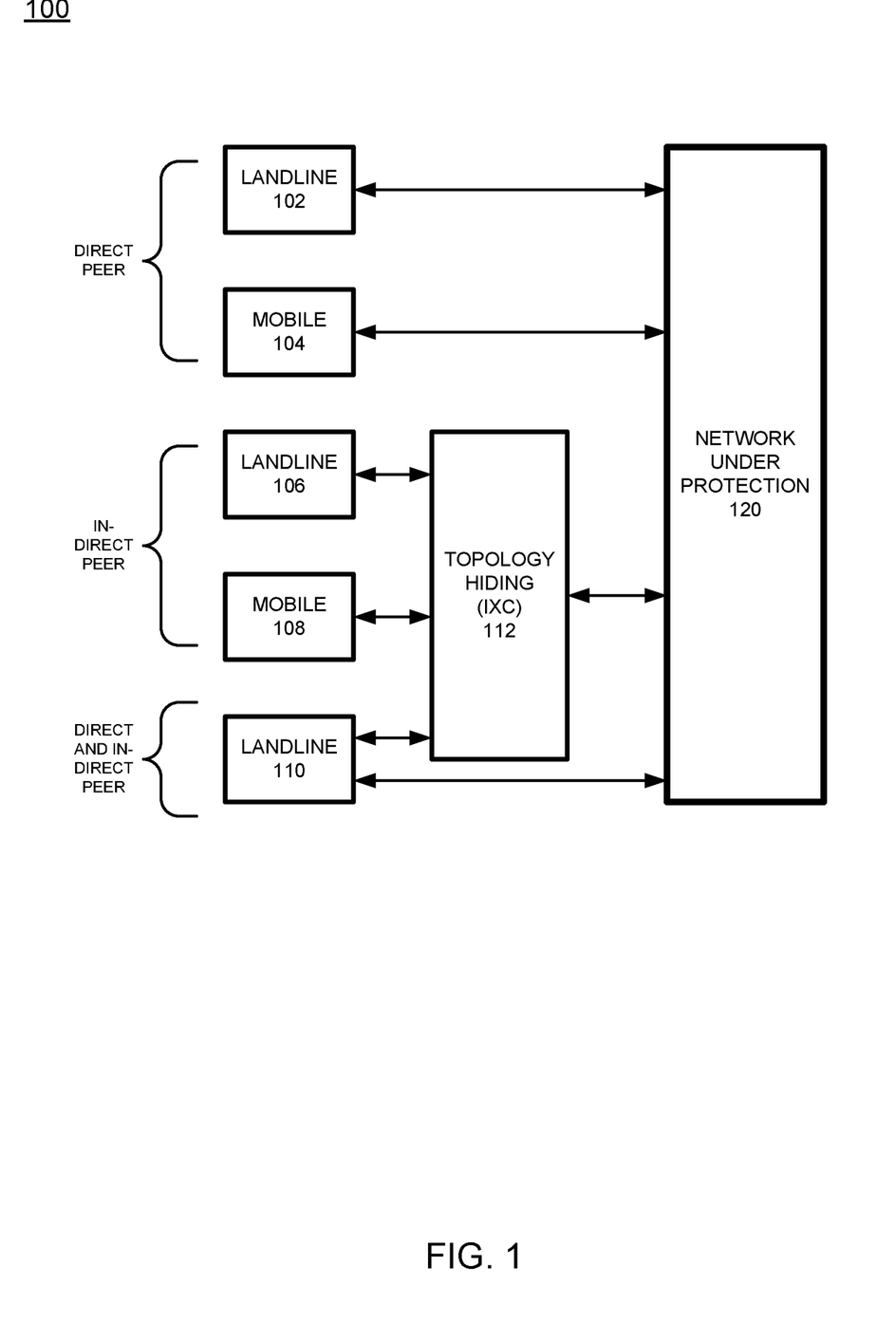

FIG. 1 illustrates an example of direct and indirect peering network configurations according to example embodiments. Referring to FIG. 1, the example configuration 100 provides a set of different communication network scenarios between calling devices and a network under protection 120, such as a carrier network that is being monitored for scam calls. In a first example, the direct peers, such as a landline 102 or mobile device 104 may places calls to a call recipient subscribed to the network under protection 120, the communication is direct and does not include additional networks, such calls are easily identified, processed and monitored for scam call characteristics since the call origin data is preserved and is not removed or replaced by third party networks.

In the example of in-direct peer communications, the landline 106 and mobile device 108 which may originate a call to a call subscriber of the network 120, the calls are intercepted by an inter-exchange carrier (IXC) network which may hide topology information by stripping/obfuscating such information off of received packets, for example, in the case of session initiation protocol (SIP) type call data. The IXC 112 will generally remove origination information and add new call origin information, which creates difficulties when performing call forensic analysis of incoming calls received at the network 120. In another example, the caller entity may be a device (i.e., landline 110) that can have its call data routed either directly or indirectly to the network 120. In this case, some call data may be identified via a direct connection while other call data may be indirect depending on the specific call routing scenario.

In the case of a landline telephone, a local exchange carrier (LEC) may utilize a direct peering relationship where the carrier only forwards traffic that is originated by its own subscribers or resellers of the service. The operating company number (OCN) of the caller is identified as being affiliated with the carrier and when the call is forwarded the last forwarding numbers should be preserved in the header data of message packets, such as the diversion or history information of the packet headers. Any other traffic could be considered suspect. In the case of a mobile phone that is setup via its carrier to communicate directly with the network 120, the carrier sends traffic from its own subscribers or any roaming subscribers currently using its network. The signaling may include the OCN of the calling party or the OCN of its roaming partners, and when the call is forwarded the last forwarding numbers then the last forwarding numbers should be owned by the carrier or its roaming partners. Any other traffic indicating otherwise would be considered suspect.

Figure 2A:
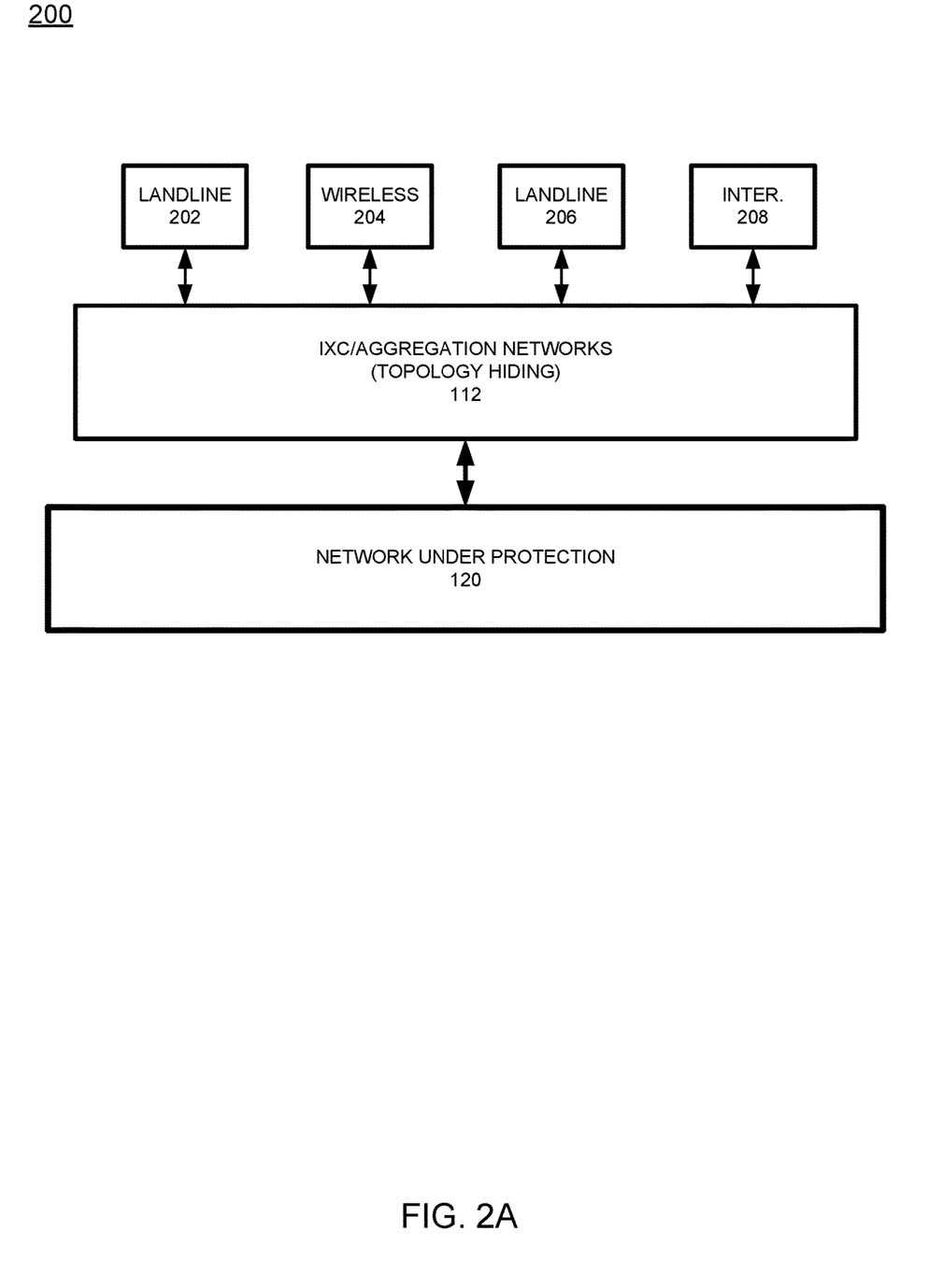

FIG. 2A illustrates an example of interexchange network call routes according to example embodiments. Referring to FIG. 2A, the configuration 200 includes carrier subscriber devices, such as a landline device 202, a wireless device 204, other landlines 206 and/or internationally located devices 208 which may be from the same or different carriers. In this example, none of the calling devices have direct relationships with the network 120. The IXC aggregation of networks 112 may strip-out certain call information effectively performing topology hiding of call origin data. Call information that is stripped-out of call data may include headers, route header, formatted INVITE messages, etc. This results in the creating of new call information, such as new INVITES. The IXC 112 behaves as a terminating point for certain call data received. The call signaling data received at the network 120 may not contain the necessary origination routing information needed to perform an origin-based call forensic analysis necessary to effectively label/block calls which have a likelihood to be considered scam/fraud type calls.

Figure 2B:
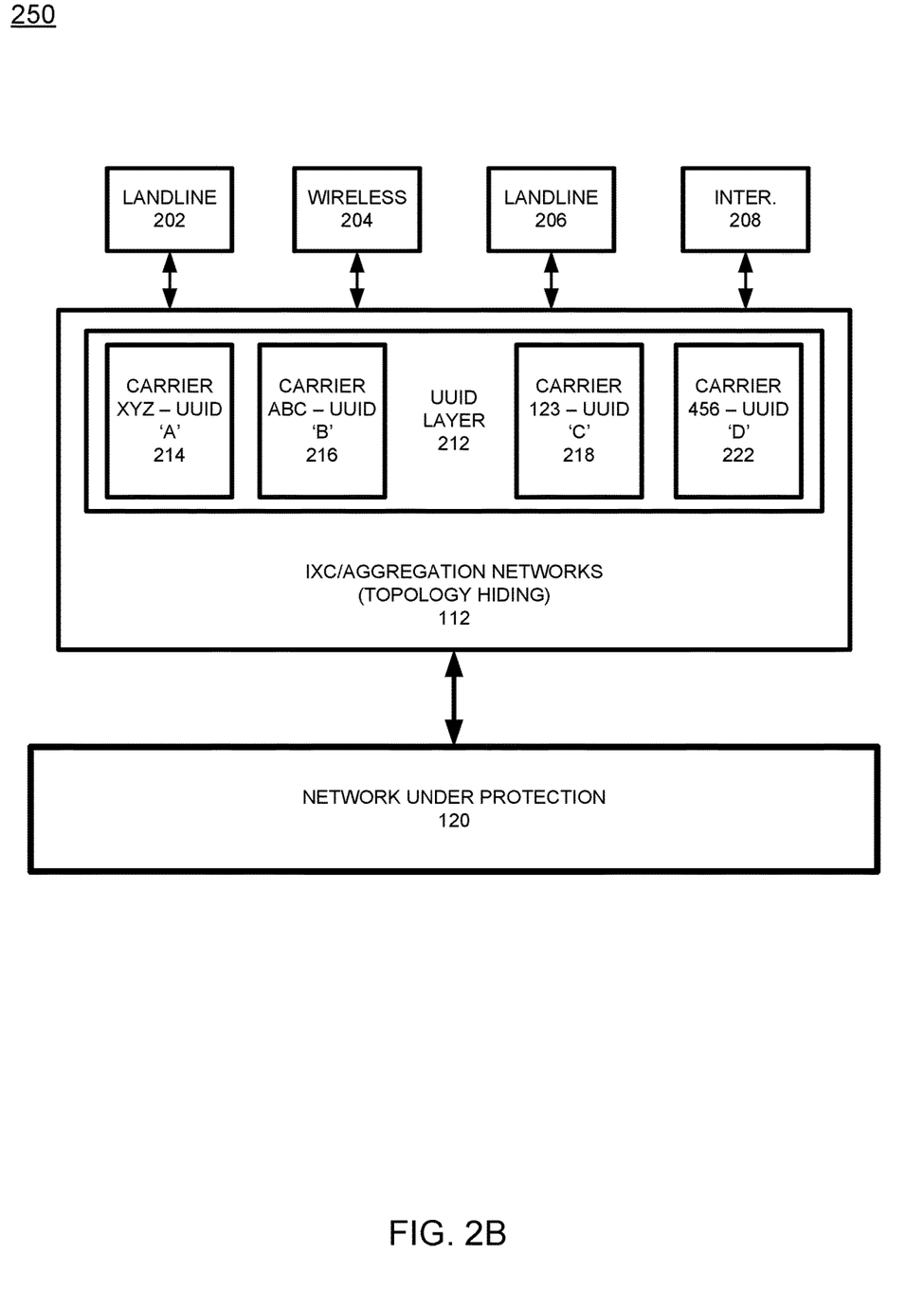

FIG. 2B illustrates an example of interexchange network call routing with identification assignments according to example embodiments. Referring to FIG. 2B, in this example 250, the IXC networks may be configured to identify an origin of the call data prior to stripping-out such information. As a result, a particular carrier identified from received call data can be preserved by a new identifier, such as a globally universally unique identifier (UUID) that can be created for each carrier identified via the call data received. The UUID layer 212 may identify the carrier, such as carrier 'XYZ', 'ABC', '123', '456', etc., and assign a particular UUID (A-D) 214-222 to those received call messages. This particular UUID assignment can be preserved and later identified during a call audit procedure to identify scam call trends.

In one example, the UUID parameter may be added for each entry point of an X-ORIGID header identified for a particular inbound route. The origin identifier 'ORIGID' parameter may be placed in the payload of an identity header. When the ORIGID header is identified, the call source can be traced to keep track of where large volumes of calls are originating from and where the calls are being routed. One example of an X-ORIGID header may include x-origid: 123e4567-e89b-12d3-a456-426655440000; index=1. Another example may be x-origid: 849e9794-b45c-d456-a898-235877528937; index=1.1. In the case of the standard for a private 'P-header', the header may be P-origination-ID: 123e4567-e89b-12d3-a456-426655440000; index=1. Another example may be P-origination-ID: 849e9794-b45c-d456-a898-235877528937; index=1.1. A header manipulation rule (HMR) is regularly used to change INVITE messages. For example, a HMR can be used as an easy way to add new X-origid headers to INVITE messages. This can be done based on a particular rule, such as, for example, if the call arrived on a particular route then add the string, X-origid: 123e4567-e89b-12d3-a456-426655440000; index=1.

Figure 2C:
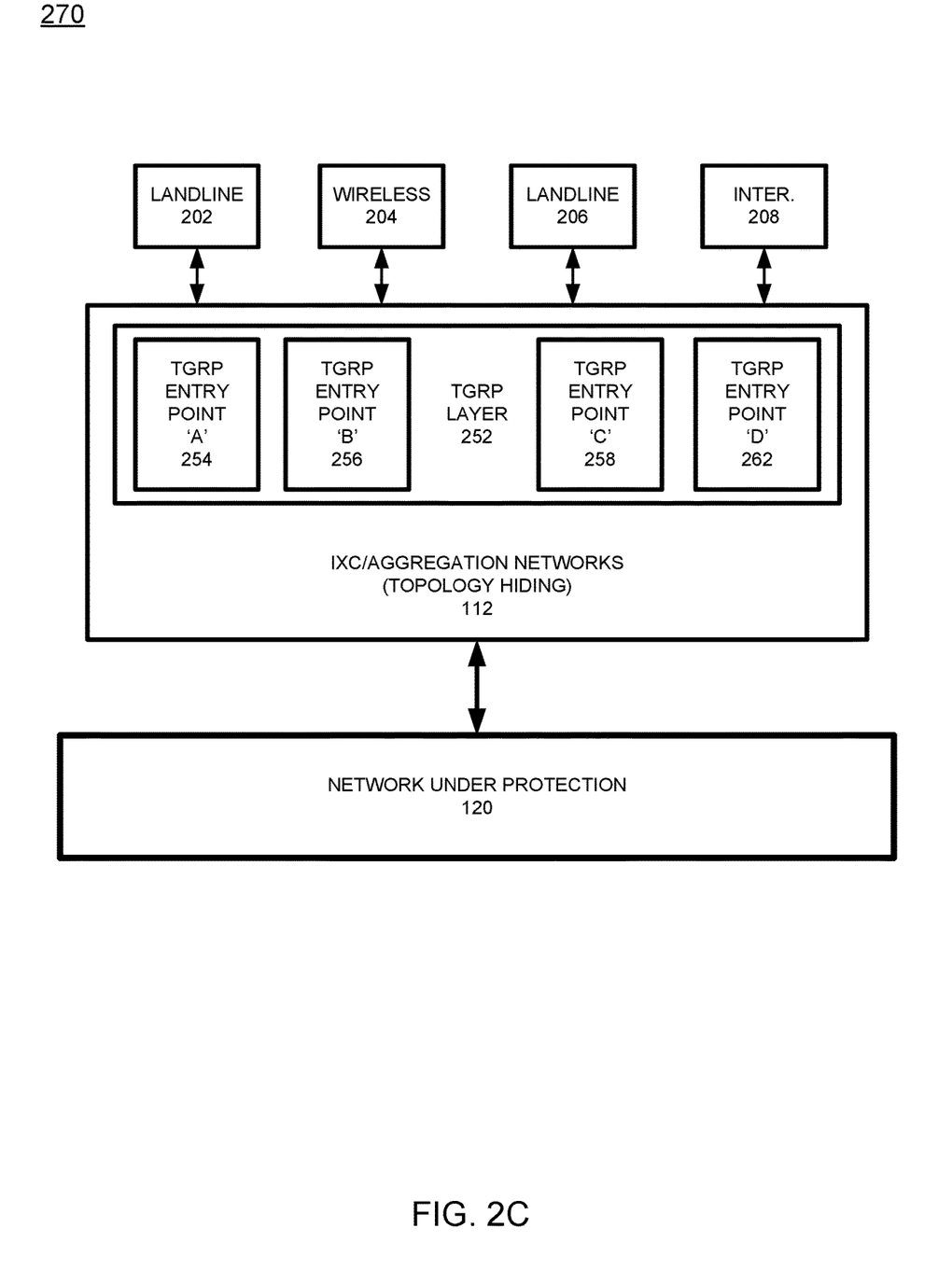

FIG. 2C illustrates an example of interexchange network call routing via trunk group assignments according to example embodiments. Referring to FIG. 2C, the example 270 provides a trunk group parameter (TGRP) being used to identify a particular trunk group that was used to forward the call data to the IXC 112. In this example, the IXC networks may identify a particular trunk group entry ('tgrp') point (A-D) 254-262 and provide a TGRP parameter in the contact header of INVITE messages destined for a network under protection. The trunk group can be identified later for call analysis/audit purposes to trace call origin information. A TGRP layer 252 in the IXC network 212 may identify the trunk group prior to stripping-out the call origin information and then add that TGRP parameter to the contact header of the INVITE;message. One example of a TGRP parameter may include Contact:<sip:+18005551000;tgrp-LACA1923; trunk-context=123.123.123.123@123.123.123.123:5060>. In this example, the trunk may be from Los Angeles California with an identifier of 1923.

One example embodiment may provide support for both UUID and TGRP parameters. Using tags UUID and/or TGRP, inserted into the call signaling data, and cross-referencing the OCN or the originating numbers to identify which carriers are represented, the call origin can be identified and used to trace the call back to a potential scam call source.

In one example, using a UUID to trace back calls to identify potential 'scam' calls may include identifying call velocity (frequency), short call duration, etc. Once calls are identified as scam, a particular trunk group shared by the recent scam calls may be identified from the INVITE information of the call messages. In one example, if a majority of calls are from a same trunk group, the likelihood of scam is higher for calls identified from the same trunk groups. A trunk group call filtering operation may be used to remove the subsequent calls received.

Figure 3A:
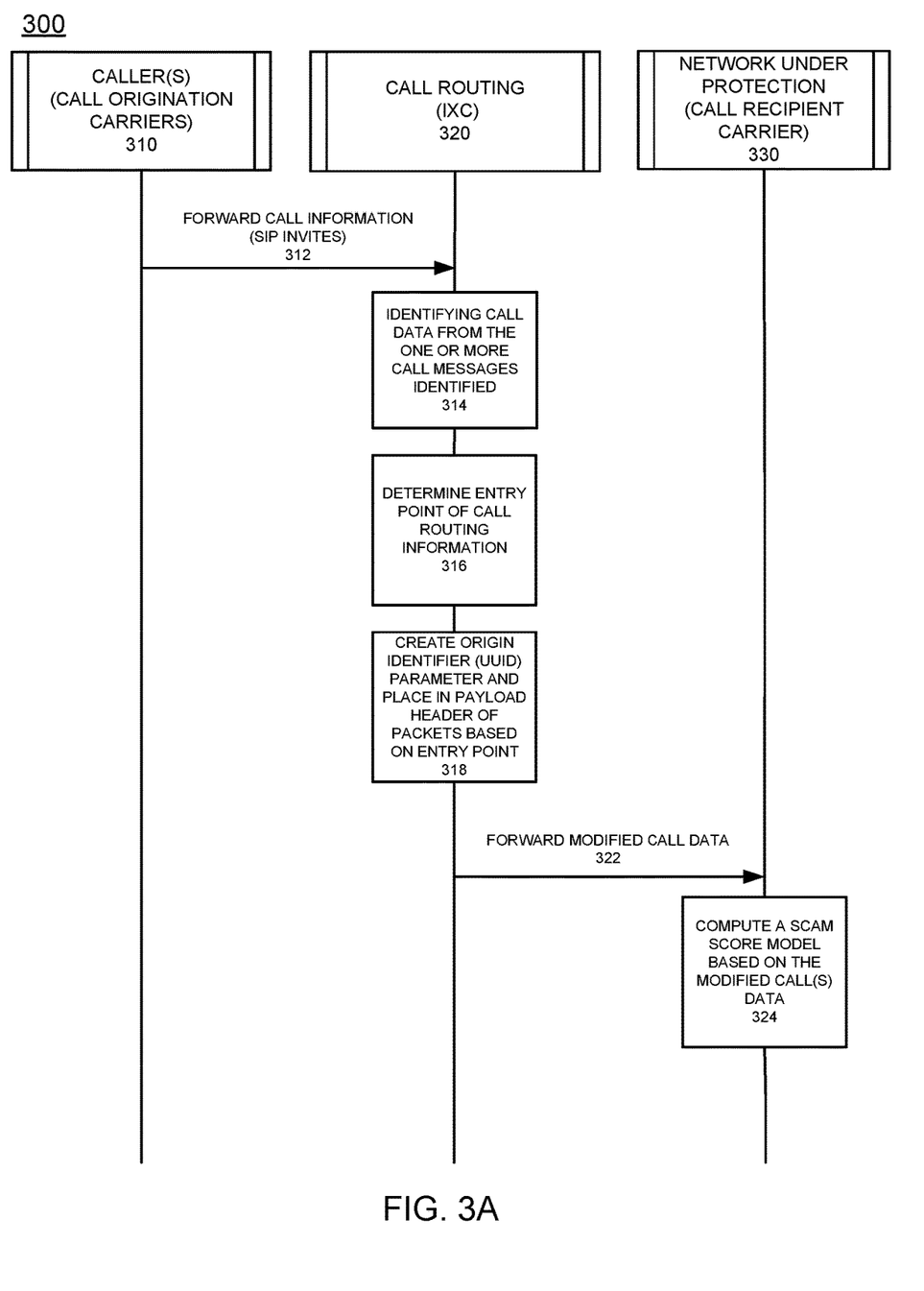

FIG. 3A illustrates a system signaling diagram of call management for origination identifiers according to example embodiments. Referring to FIG. 3A, the configuration 300 includes a caller or call origination sources 310, such as carrier networks forwarding calls intended for subscribers of the network under protection or network being monitored 300. The intermediate call routing networks or IXCs 320 may perform mandated call management procedures for a network under protection 330, such as receiving forwarded call messages 312, identifying the call data from the call messages 314, which may include removing various call headers and other routing information. Determining an entry point of the call routing information 316 and creating an origin/entry point identifier UUID parameter 318 based on the identified call entry point. The UUID may be placed in the payload header of the packets based on the entry point identified. The modified call data can then be forwarded to its intended destination 322, such as a subscriber of the network under protection. The call may be identified as potential scam based on a scoring model used to identify suspicious calls from particular locations 324.

Figure 3B:
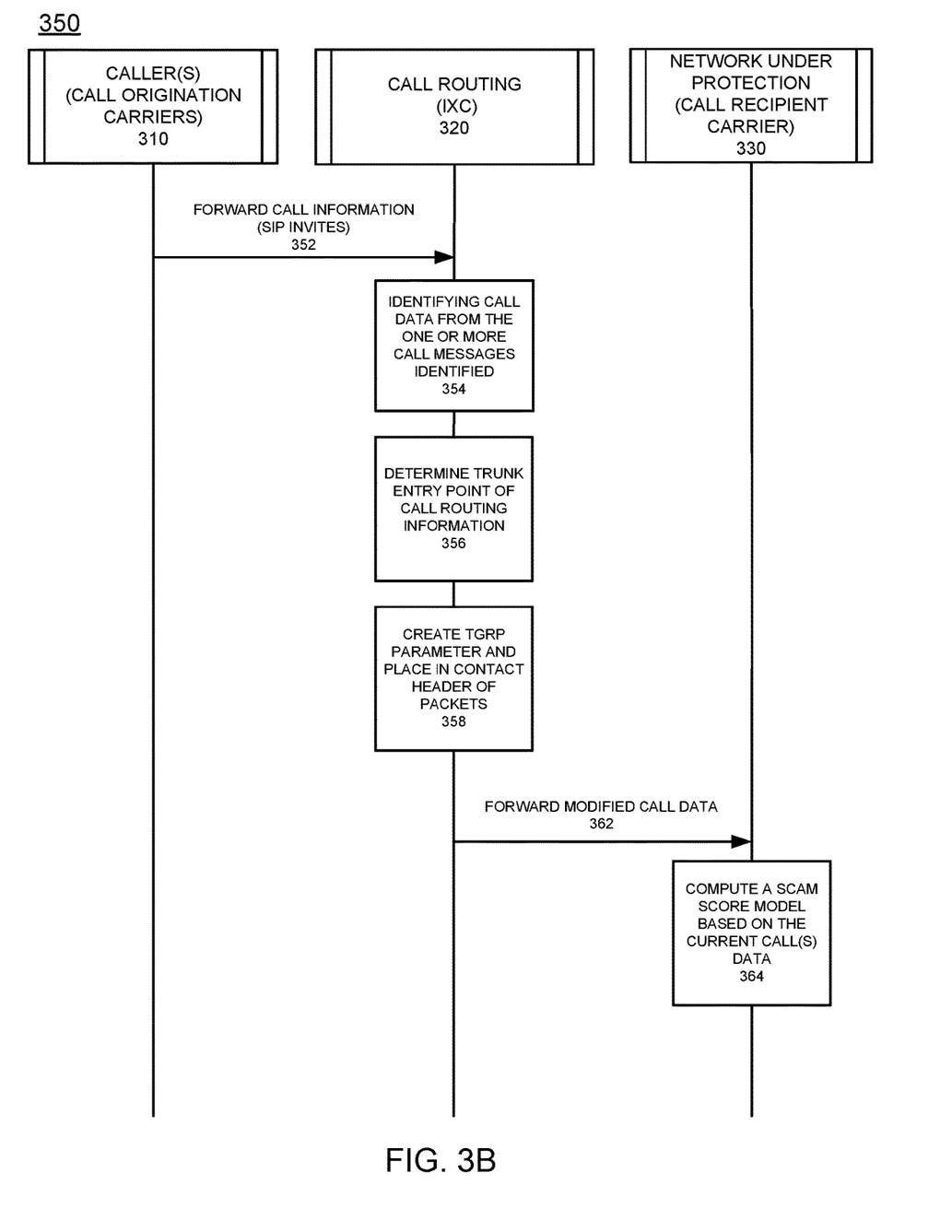

FIG. 3B illustrates a system signaling diagram of call management for trunk group parameter identifiers according to example embodiments. Referring to FIG. 3B, the system configuration 350 includes forwarding call data 352, identifying forwarded call information 354, determining a trunk entry point 356 from the call routing information, such as which trunk group sent the call message, and creating TGRP parameters which identify the trunk groups and placing the TGRP parameters in a contact header of the packets 358. The call data is forwarded 362 and the corresponding call data can be examined for scam call potential 364.

Figure 4:
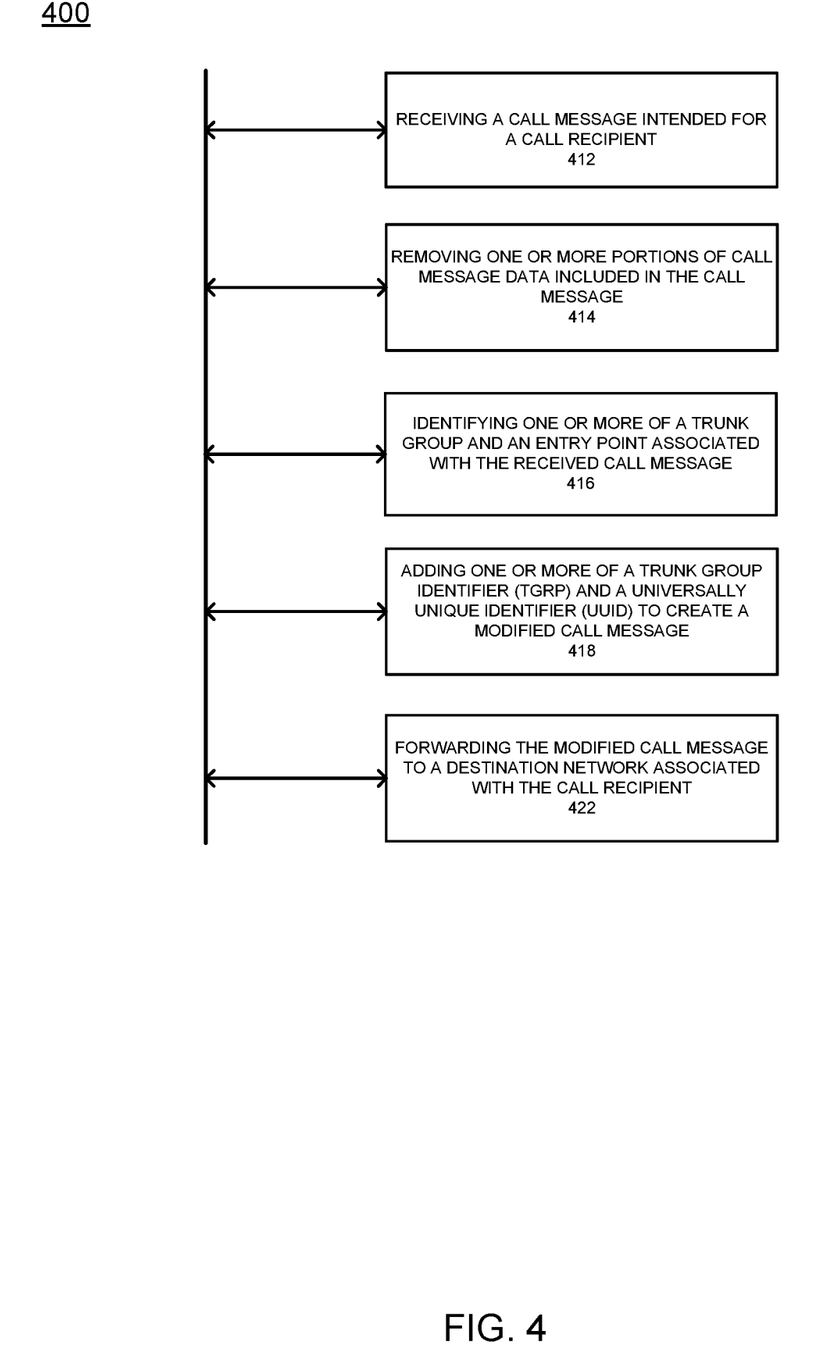

FIG. 4 illustrates an example method of a call management configuration according to example embodiments. The example process 400 may include receiving a call message intended for a call recipient 412, removing one or more portions of call message data included in the call message 414, identifying one or more of a trunk group and an entry point associated with the received call message 416, adding one or more of a trunk group identifier (TGRP) and a universally unique identifier (UUID) to create a modified call message 418, and forwarding the modified call message to a destination network associated with the call recipient 422.

The call message may include a SIP INVITE. The adding the one or more of the TGRP and the UUID to create the modified call message may include adding the UUID to a payload portion of an X-header of the call message. The adding the one or more of the TGRP and the UUID to create the modified call message includes adding the TGRP to a contact header of the SIP INVITE message. The TGRP may identify which trunk group where the call message was received. The TGRP identifies a telephone number, a location identifier and an IP address and may identify other parameters. The process may also include retrieving an operating company number (OCN) parameter based on a telephone number included in the call message, and determining a carrier network associated with the call message origin based on the OCN and one or more of the TGRP and the UUID.

One example of an INVITE which is modified based on network access UUID modifications added each time a network intercepts an INVITE may include:

INVITE
sip:+22222222222;npdi@208.54.48.26:5060;user=phone
  SIP/2.0
Via:        SIP/2.0/UDP        74.120.92.19:5060;
  branch=z9hG4bK0eBecfb9c7e5dd3aa30
From:       <sip:+11111111111@74.120.92.19:5060;
  user=phone;pstn-params=908481808882>;
  tag=gK0e3e2cbb
To:        <sip:+22222222222@208.54.48.26:5060;
  user=phone>
Call-ID: 307131393_61734396@74.120.92.19
CSeq: 464608 INVITE
Max-Forwards: 39
Allow:
INVITE,ACK,CANCEL,BYE,REGISTER,REFER,
  INFO,SUBSCRIBE,NOTIFY,PRACK,   UPDATE,
  OPTIONS, MESSAGE, PUBLISH
Accept: application/sdp, application/isup, application/
  dtmf, application/dtmf-relay, multipart/mixed
Contact:   <sip:+11111111111;tgrp=GW_GW;trunk-context=74.120.92.19@74.120.92.19:5060>
P-Asserted-Identity: sip: +11111111111@74.120.92.19:
  5060;user=phone
X-origid:    123e4567-e89b-12d3-a456-426655440000;
  index=1
X-origid:    849e9794-b45c-d456-a898-235877528937;
  index=1.1
Supported: timer,100rel
Session-Expires: 1800
Min-SE: 90
Content-Length: 234
Content-Disposition: session; handling=required
Content-Type: application/sdp

```
v=0
o=Sonus_UAC 79054 488631 IN IP4 74.120.92.19
s=SIP Media Capabilities
c=IN IP4 74.120.92.19
t=0 0
m=audio 39586 RTP/AVP 0 101
a=rtpmap:0 PCMU/8000
a=rtpmap:101 telephone-event/8000
a=fmtp:101 0-15
a=sendrecv
a=ptime:20.
```

As indicated in the example INVITE message, the UUID was added twice such that each time is unique and the index was incremented each time to indicate the addition of a new UUID based on a new network UUID assignment. For example, index 1.0 is a first UUID assignment, and index 1.1 is a second UUID assignment.

Figure 5:
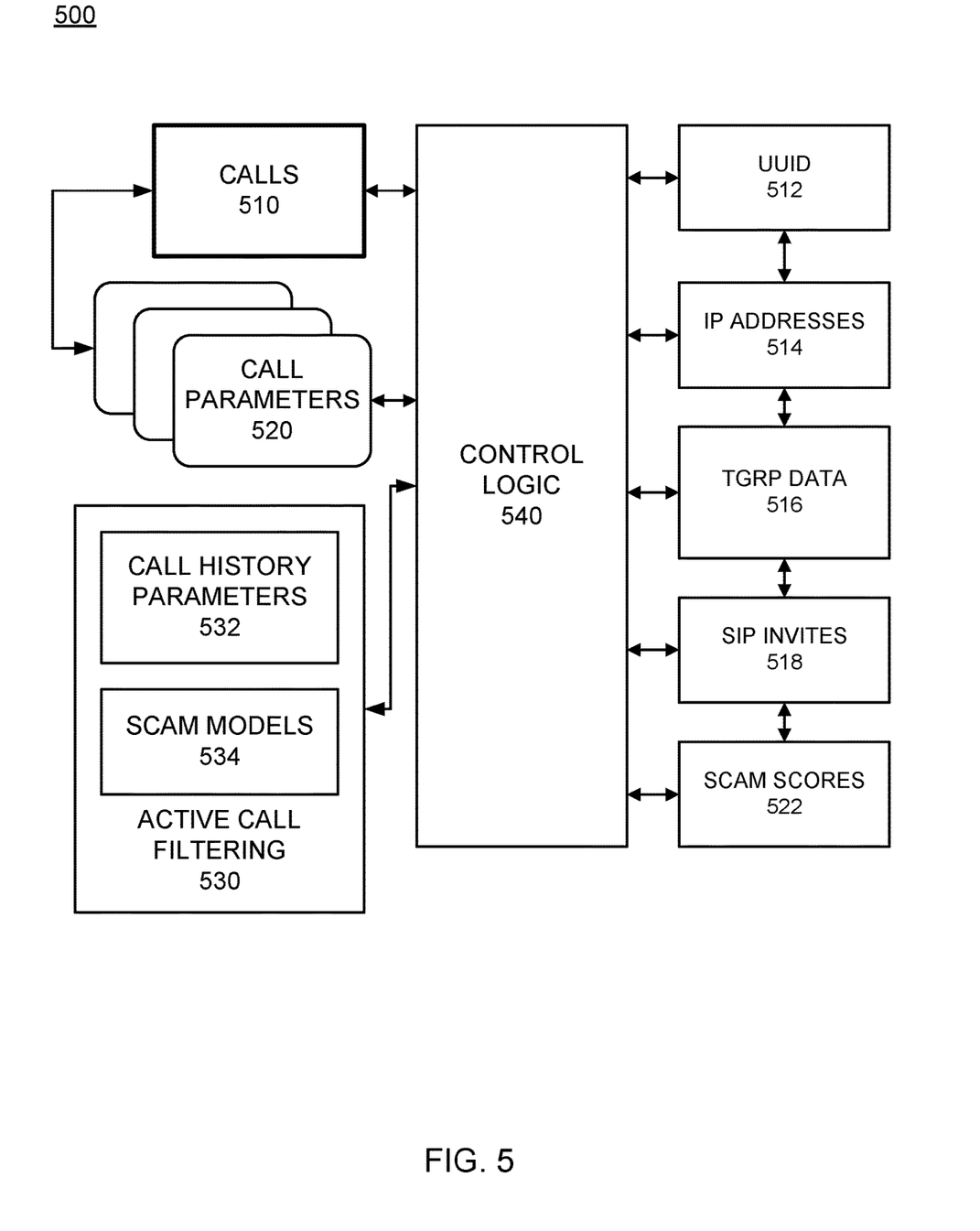

FIG. 5 illustrates a logic diagram with example data input and output parameters for performing call processing according to example embodiments. Referring to FIG. 5, the logic module configuration 500 may include a processing unit or processor 540 which receives various inputs, such as calls 510, call parameters 520, filtering criteria, such as call history parameters 532, scam models 534 and other active call filtering 530 criteria. The output information may include a UUID 512, an IP address 514, a TGRP parameter 516, modified SIP INVITES 518 and potentially scam scores 522 resulting from analyzed call information which includes the added parameters.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
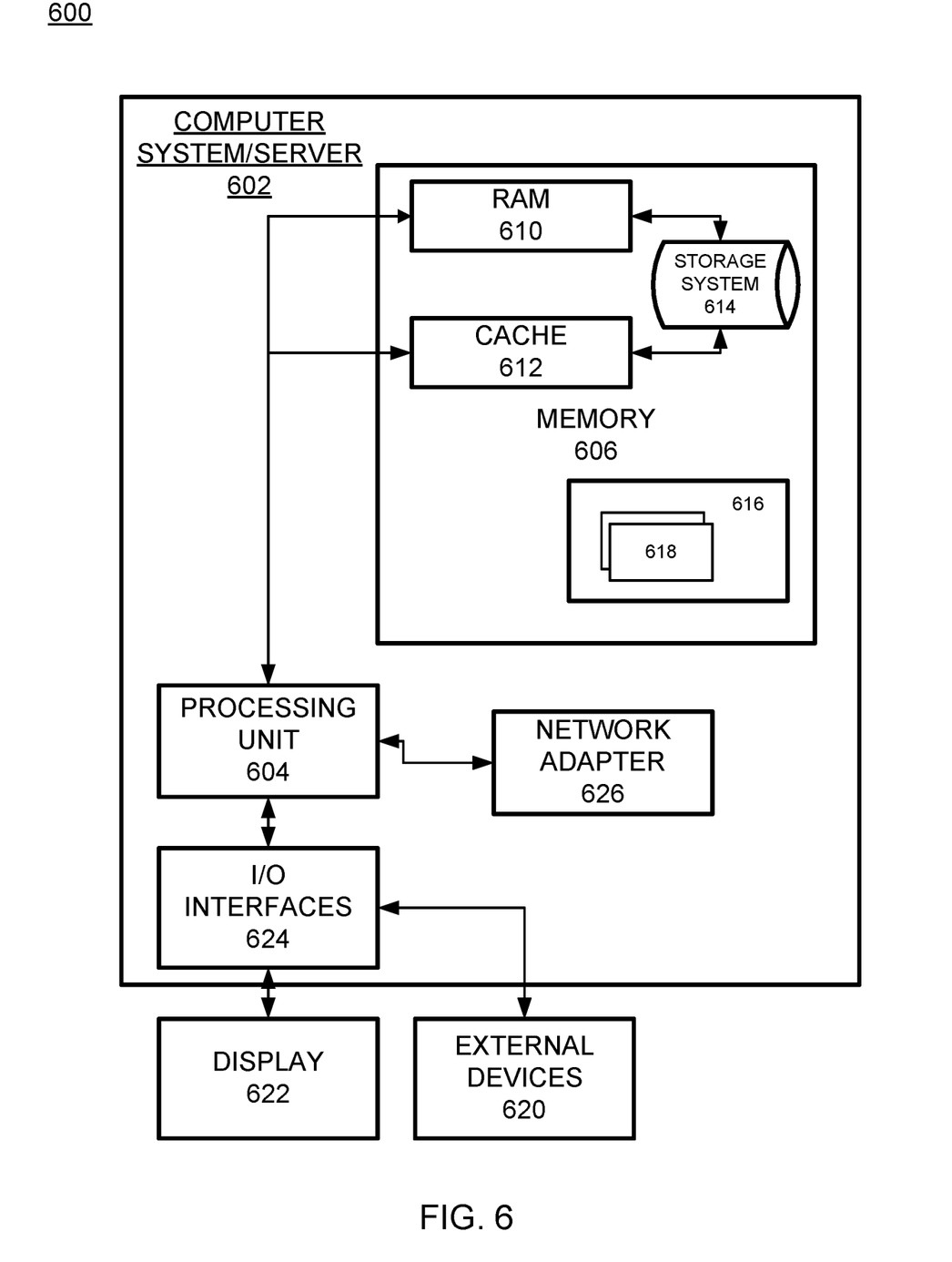

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
    identifying origin carrier information and a trunk group identifier (TGRP) associated with call origin information of a call message intended for a call recipient prior to removing the call origin information;
    removing the call origin information;
    adding the identified trunk group identifier (TGRP) to a contact header portion of a call message header of the call message to create a modified call message that identifies the origin carrier information, and a particular trunk group used to forward the call message data;
    forwarding the modified call message to a destination network associated with the call recipient;

retrieving an operating company number (OCN) parameter from an external data source based on a telephone number identified by the TGRP in the call message header; and determining the origin carrier network based on the OCN and the TGRP.

2. The method of claim 1, wherein the call message comprises a SIP INVITE.

3. The method of claim 1, comprising adding a UUID to create the modified call message by adding the UUID to a payload portion of an X-header of the call message.

4. The method of claim 2, wherein the contact header is added to the SIP INVITE message.

5. The method of claim 1, wherein the TGRP further identifies a trunk group where the call message was received.

6. The method of claim 1, wherein the TGRP further identifies a location identifier and an IP address.

7. An apparatus comprising:
a processor configured to
identify origin carrier information and a trunk group identifier (TGRP) associated with a call message intended for a call recipient prior to removal of the call origin information;
remove the call origin information;
add the identified trunk group identifier (TGRP) to a contact header portion of a call message header of the call message to create a modified call message that identifies the origin carrier information and a particular trunk group used to forward the call message data; and
a transmitter configured to forward the modified call message to a destination network associated with the call recipient;
wherein the processor is further configured to retrieve an operating company number (OCN) parameter from an external data source based on the telephone number identified by the TGRP in the call message; and
determine the origin carrier network based on the OCN and the TGRP.

8. The apparatus of claim 7, wherein the call message comprises a SIP INVITE.

9. The apparatus of claim 7, wherein the processor is further configured to add a UUID to create the modified call message and the UUID is added to a payload portion of an X-header of the call message.

10. The apparatus of claim 9, wherein the contact header is added the SIP INVITE message.

11. The apparatus of claim 7, wherein the TGRP further identifies a trunk group where the call message was received.

12. The apparatus of claim 7, wherein the TGRP further identifies a location identifier and an IP address.

13. A non-transitory computer readable storage medium configured to store instructions that when executed cause a processor to perform:
identifying origin carrier information and a trunk group identifier (TGRP) associated with call origin information of a call message intended for a call recipient prior to removing the call origin information;
removing the call origin information;
adding the identified trunk group identifier (TGRP) to a contact header portion of a call message header of the call message to create a modified call message that identifies the origin carrier information and a particular trunk group used to forward the call message data;
forwarding the modified call message to a destination network associated with the call recipient;
retrieving an operating company number (OCN) parameter from an external data source based on a telephone number identified by the TGRP in the call message header; and
determining the origin carrier network based on the OCN and the TGRP.

14. The non-transitory computer readable storage medium of claim 13, wherein the call message comprises a SIP INVITE.

15. The non-transitory computer readable storage medium of claim 13, wherein the processor is further configured to perform adding a UUID to create the modified call message by adding the UUID to a payload portion of an X-header of the call message.

16. The non-transitory computer readable storage medium of claim 14, wherein the contact header is added to the SIP INVITE message.

17. The non-transitory computer readable storage medium of claim 13, wherein the TGRP further identifies a trunk group where the call message was received.

18. The non-transitory computer readable storage medium of claim 13, wherein the TGRP further identifies a location identifier and an IP address.

* * * * *